United States Patent
Yamada et al.

[19]

[11] Patent Number: 6,147,822
[45] Date of Patent: Nov. 14, 2000

[54] IMAGE DISPLAY DEVICE APPLYING LIGHT BEAM SCANNING CAPABLE OF DIRECT IMAGE FORMATION ON RETINAS OF OBSERVERS

[75] Inventors: Keizo Yamada; Toshihide Kuriyama, both of Tokyo, Japan

[73] Assignee: NEC Corporation, Tokyo, Japan

[21] Appl. No.: 09/113,545

[22] Filed: Jul. 10, 1998

[30] Foreign Application Priority Data

Jul. 10, 1997 [JP] Japan .................................. 9-185227

[51] Int. Cl.[7] ....................................................... G02F 5/00
[52] U.S. Cl. ................................................................. 359/900
[58] Field of Search ...................................... 359/618, 630, 359/197, 212, 201, 202; 345/7, 8, 9; 348/744, 746; 351/209, 210

[56] References Cited

U.S. PATENT DOCUMENTS 5,467,104  11/1995  Furness, III et al. ...................... 345/8
5,703,637  12/1997  Miyazaki et al. ......................... 348/53
5,903,397  5/1999   Melville et al. ........................ 359/630

*Primary Examiner*—Ricky Mack
*Attorney, Agent, or Firm*—McGinn & Gibb, P.C.

[57] ABSTRACT

An image display device of the present invention comprises a light converting means which converts picture signals into light beams, and a light beam scanning means which scans by beams. The light beam scanning means is provided with an x-axis optical scanner and a y-axis optical scanner each of which has a moving mirror and an excitation means. The moving mirror reflects a light beam from a light source in cascade, reflection directions being subjected to a perpendicular resonance rotation oscillation with each other because of a light beam scanning, each resonant rotation oscillation having a resonance frequency which is the same with or close to the other and being phase shifted by 90° with respect to the other while having a predetermined oscillation ratio. The light beam scanning means implements a light beam scanning in a circumference direction of a circle having its center at a certain point on a screen or on a retina of a human eye, thus forming a picture image having a scanning line structure of a concentric circle form or a spiral form, with the pixels having been altered their density or size in accordance with a distance from the center.

24 Claims, 12 Drawing Sheets

LIGHT DOT

LIGHT DOT

IMAGE DISPLAY DEVICE APPLYING LIGHT BEAM SCANNING CAPABLE OF DIRECT IMAGE FORMATION ON RETINAS OF OBSERVERS

BACKGROUND OF THE INVENTION

The present invention relates to an image display device, especially to that which is capable of carrying out image formation directly on retinas of observers due to an application of a light beam scanning.

DESCRIPTION OF THE RELATED ART

A great many ways for image reproduction applying electronic technology have been proposed in the past. Among them, the most familiar is a television, which obtains its picture images by scanning electron beams. As to an image formation mechanism of a television as shown in FIG. 1, the fundamental principle is as follows: a picture image which is supposed to be displayed is uniformly decomposed into a number of unit picture elements (i.e. pixels) having the same size; and by applying a rectangular coordinate system, in which the position is non-optionally decided by horizontal and vertical coordinates, colors and brightness of the entire pixels are designated consecutively in order, according to picture signals, starting from the upper left, in order to reproduce the picture image.

There is another system in which a picture image of the above-mentioned type is reproduced by scanning light beams. In this case, an image reproduction should be carried out by a light beam scanning instead of an electron beam scanning conducted by a cathode-ray tube. For instance, there is a disclosure of U.S. Pat. No. 5,467,104, characterized in that a picture image is reproduced by having light beams scanned in accordance with synchronizing signals of image refreshing, in the horizontal direction for scores of kilohertz, and in the vertical direction for scores of hertz.

Because of this light beam scanning, two kinds of moving mirrors, which reflect the light beam by changing a reflection direction according to a synchronizing signal of image refreshing, are used. One of them is a galvano-mirror which is workable comparatively in a low-frequency region. The galvano-mirror is used in scanning light beams in the vertical direction. The other one of the two is a resonant mirror which is capable of high-speed operation. The resonant mirror is used in scanning light beams in the horizontal direction.

With respect to an image formation method of a line scanning system such as a conventional NTSC, it is difficult to reproduce a picture image in which an image resolution changes depending on a display position. Moreover, when using a method of image formation which applies light beams and scans in the horizontal and vertical directions, two different sorts of moving mirrors should be used. That is, a moving mirror with a low resonance frequency and a moving mirror with a high resonance frequency have to be used. In particular, the low resonance frequency moving mirror tends to become bigger, fragile, and easily influenced by low-frequency ambient noises, thus having its quality of image become deteriorated. Accordingly, it is also difficult to minimize the two moving mirrors as a whole.

SUMMARY OF THE INVENTION

It is therefore an object of the present invention to provide an image display device of a light beam scanning type, which is miniaturized, improved with its image quality, and cut down with its production costs.

According to a first aspect of the present invention there is provided an image display device forming pixels by light beams which are brilliance-modulated in accordance with picture signals, implementing a light beam scanning in which a reflection direction of a light beam is oscillated in synchronization with a synchronizing signal of image refreshing, thus forming a picture image on a retina of the observer's eye or on a screen in order to complete an image display, comprising; a light beam scanning means for implementing a light beam scanning in a circumference direction of a circle having its center at a particular point on a screen or on a retina of a human eye, thus forming a picture image having a scanning line structure of a concentric circle form or a spiral form, with the pixels having been altered their density or size in accordance with a distance from the center.

According to a second aspect of the present invention, there is provided an image display device in accordance with the first aspect, wherein; the light beam scanning means includes two moving mirrors reflecting a light beam from a light source in cascade, reflection directions being subjected to a perpendicular resonant rotation oscillation with each other because of a light beam scanning, each resonant rotation oscillation having a resonance frequency which is the same with or close to the other and being phase shifted by 90° with respect to the other while having a predetermined oscillation ratio.

According to a third aspect of the present invention, there is provided an image display device according to the first aspect, wherein; the light beam scanning means includes a moving mirror reflecting a light beam from a light source, a reflection direction being oscillated with two resonant rotation oscillation modes having rotation axis which are perpendicular to each other due to a light beam scanning, each resonance rotation oscillation having a resonance frequency which is the same with or close to the other and being phase shifted by 90° with respect to the other while having a predetermined oscillation ratio.

According to a fourth aspect of the present invention, there is provided an image display device according to the second aspect, wherein; each resonant rotation oscillation takes air viscosity in the surroundings of each moving mirror as its oscillation attenuation factor, while having an oscillation attenuation time restricted to within one 30th of a second.

According to a fifth aspect of the present invention, there is provided an image display device according to the second aspect, wherein; the light beam scanning means includes an excitation means for each of said mirrors, the excitation means inputting excitation control signals each of which has said resonance frequency, so as to excite each resonant rotation oscillation having an oscillation amplitude and an oscillation phase corresponding to an amplitude and a phase of each inputted excitation control signal.

According to a sixth aspect of the present invention, there is provided an image display device according to the fifth aspect, wherein; the light beam scanning means includes an excitation control circuit for generating a signal having said resonance frequency in synchronization with the synchronizing signal, and controlling an amplitude and a phase of the signal, so as to output it to each excitation means as the excitation control signal.

According to a seventh aspect of the present invention, there is provided an image display device according to the sixth aspect, wherein; an amplitude of the excitation control signal is linear-changed or nonlinear-changed in a sawtooth-like form with respect to a scanning time, and changed at the same time in a staircase-like form with respect to a resonance cycle, in synchronization with the synchronizing signal.

According to an eighth aspect of the present invention, there is provided an image display device according to the sixth aspect, wherein; an amplitude of the excitation control signal is linear-changed or nonlinear-changed in a sawtooth-like form with respect to a scanning time, and changed consecutively at the same time, in synchronization with the synchronizing signal.

According to a ninth aspect of the present invention, there is provided an image display device according to the sixth aspect, further comprising; a light converting means for implementing brilliance modulation according to the picture signal while controlling a beam width in accordance with an amplitude of each excitation control signal, thus outputting the light beam to the light beam scanning means.

According to a tenth aspect of the present invention, there is provided an image display device according to the first aspect, further comprising: a line of sight detecting means for detecting an observer's line of sight; and a center coordinate moving means, responsive to the line of sight detected by the line of sight detecting means, for moving a center coordinate of the scanning line structure which is either of the concentric circle form or of the spiral form.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

DESCRIPTION OF THE PREFERRED EMBODIMENTS

Figure 1:
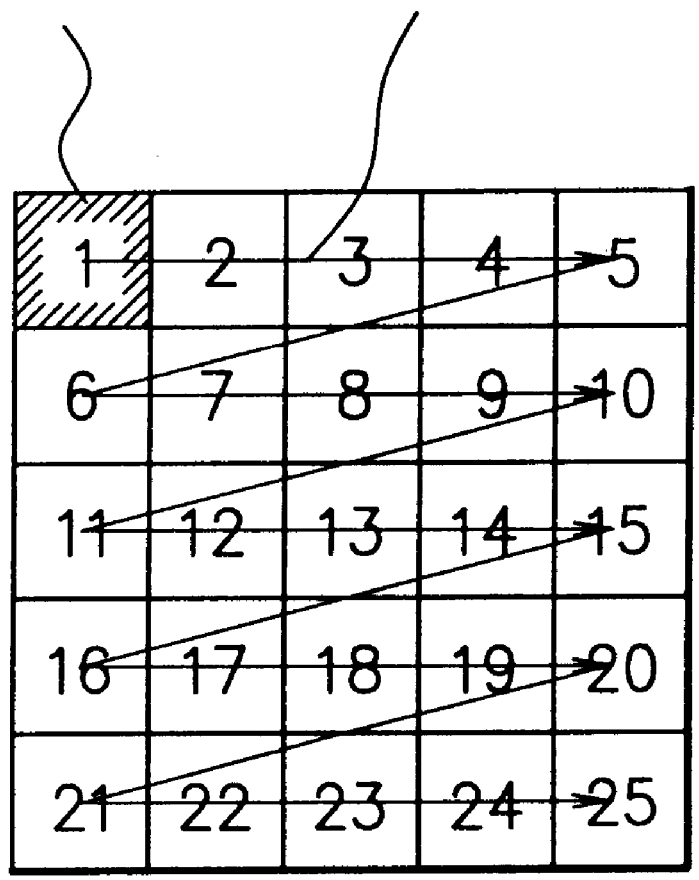
FIG. 1 is a diagram showing a mechanism of a conventional scanning line structure.

Referring now to the drawings, a description of preferred embodiments of the present invention will be given in detail.

Figure 2:
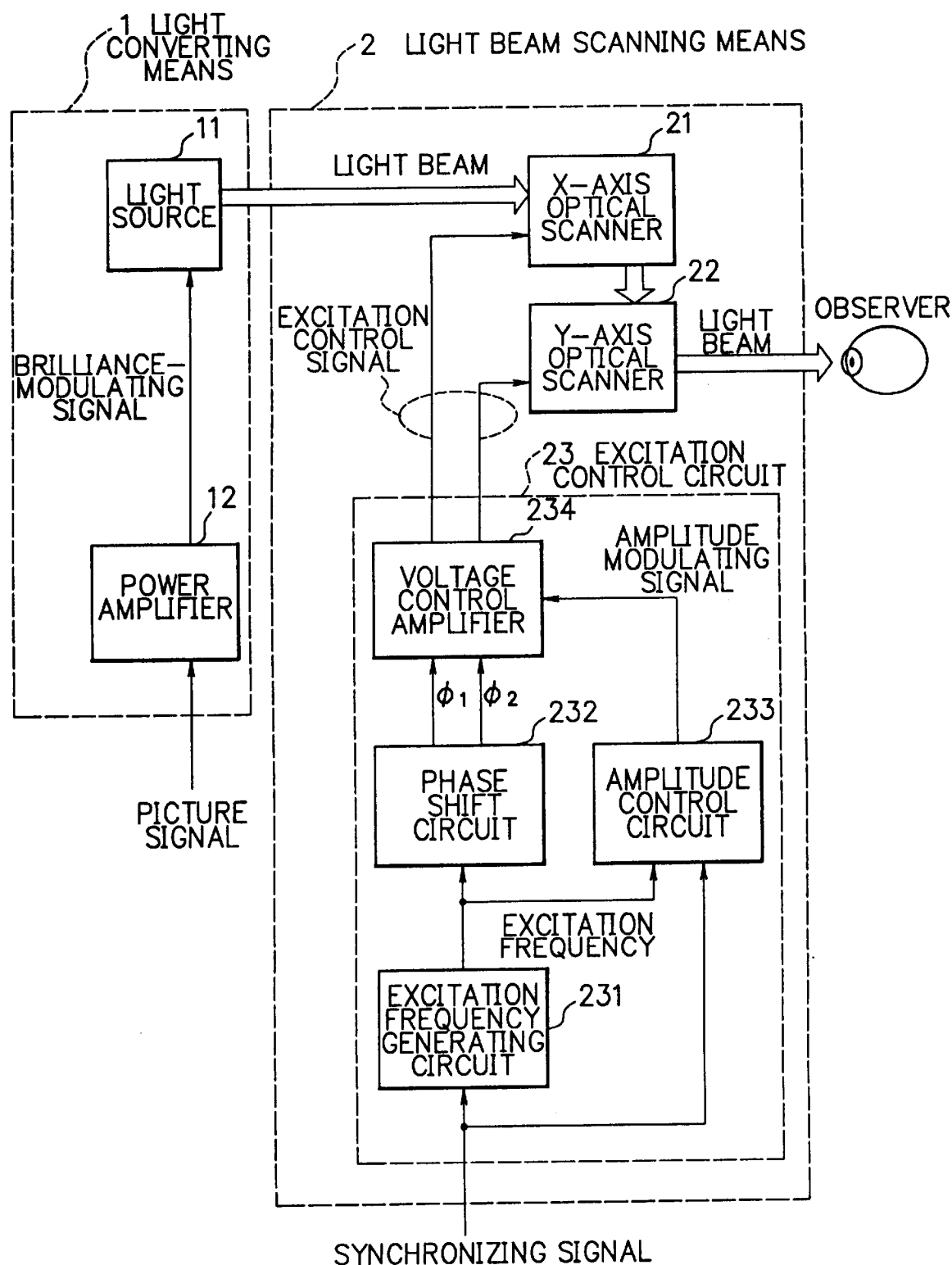
FIG. 2 is block diagram showing the image display device of a first embodiment of the present invention.
Figure 3:
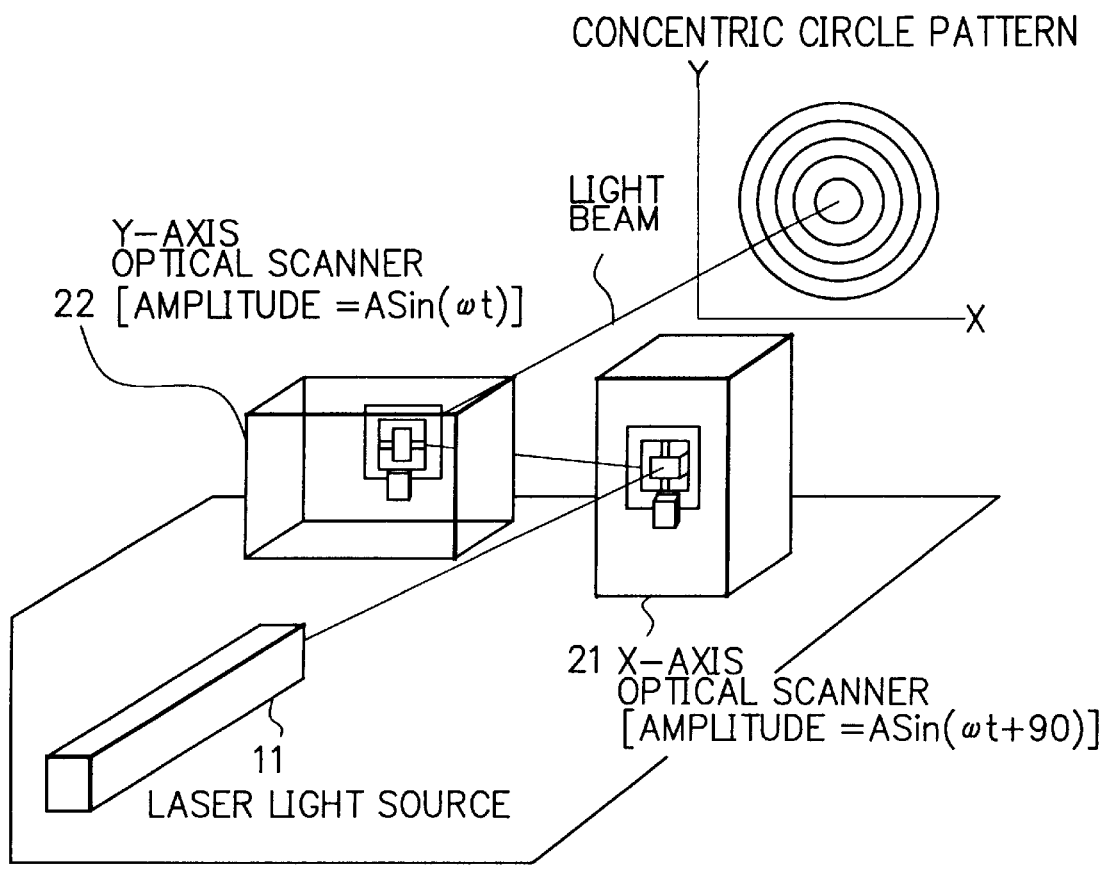
FIG. 3 is a route diagram showing a route of a light beam in the image display device illustrated in FIG. 2.

FIG. 2 is a block diagram showing the image display device of a first embodiment of the present invention. Similar to the main structure of the conventional image display device, the image display device of the present embodiment comprises a light converting means 1 which converts picture signals into light beams, and a light beam scanning means 2 which scans by beams. Also similar to the conventional case, the image display device is to form pixels by light beams which are being brilliance-modulated in accordance with the picture signals. The device implements a light beam scanning in which a reflection direction of a light beam is oscillated in synchronization with a synchronizing signal of image refreshing, so as to form a picture image on a retina of the observer or on a screen in order to complete the image display. In this occasion, the light beam scanning is carried out in a circumference direction of a circle having its center at a particular point on the screen or on the retina, thus forming a picture image having a scanning line structure of a concentric circle form or a spiral form, with pixels having been altered their density or size in accordance with a distance from the center. FIG. 3 is a route diagram showing a route of a light beam which is responsible for an image formation.

The light converting means 1 comprises a power amplifier 12, and a light source 11. The power amplifier 12 inputs a picture signal so as to output a brilliance-modulating signal to the light source 11. Here the brilliance-modulating signal serves to conduct brilliance modulation of a light beam. The light source is made of a semiconductor red-color laser. The light source outputs the light beam which is brilliance-modulated to the light beam scanning means. Here, picture signals which are obtained through concentric-circle scanning or spiral scanning are to be inputted instead of picture signals obtained through vertical and horizontal scanning as in the conventional NTSC system. Therefore, it might be necessary to change the picture signals from the rectangular coordinate system to a circle coordinate system depending on the structure of the device. This change of coordinate system, however, is possible in real time basis considering the operation speed of today's computers.

Figure 4:
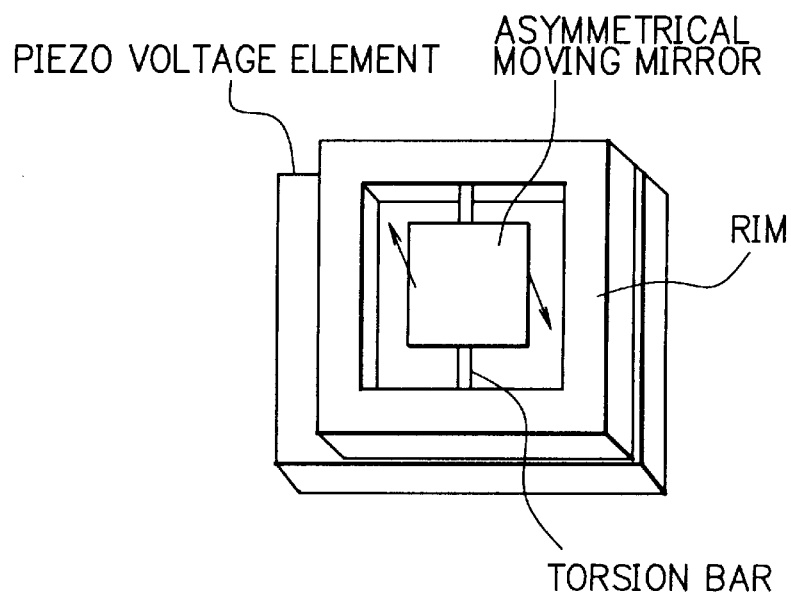
FIG. 4 is a structural diagram illustrating a structure of an optical scanner of the image display device shown in FIG. 2.

The light beam scanning means 2 comprises an x-axis optical scanner 21, a y-axis optical scanner 22, and an excitation control circuit 23. Each of the two optical scanners 21 and 22 is provided with a moving mirror and an excitation means. FIG. 4 is a structural diagram illustrating a structure of the optical scanners 21 and 22.

Each moving mirror is made of either phosphor bronze or titanium. The mirror is a shape of 2 mm square, which is 100μ wide, 200μ thick, and has 600μ long torsion bars. Each of those moving mirrors is to reflect the light beam from the light source in cascade. In this occasion, the reflection directions are subjected to a perpendicular resonant rotation oscillation with each other because of the light beam scanning. Each resonant rotation oscillation has a resonance frequency of 15.74 kHz, which is the same or close to the other, and is phase shifted by 90° with respect to the other, while also having a predetermined oscillation ratio. Naturally, in order to further miniaturize the device and have it become capable of working under high frequency, it is also one option to construct the optical scanners with silicon. Each excitation means comprises a piezo voltage element and other constituents, the piezo voltage element having a size of 3×1×10 mm. The excitation means is attached to a corresponding moving mirror, inputs an excitation control signal having a frequency of 15.74 kHz, so as to excite the resonant rotation oscillation provided with an oscillation amplitude and an oscillation phase which correspond to the amplitude and the phase of the signal.

The excitation control means 23 is provided with an excitation frequency generating circuit 231, a phase shift circuit 232, an amplitude control circuit 233, and a voltage control amplifier 234.

The excitation frequency generating circuit 231 generates an excitation frequency signal having a frequency of 15.74 kHz, in synchronization with a synchronizing signal, the excitation frequency signal serving to excite the resonant rotation oscillation of each moving mirror. The phase shift circuit 232 inputs the excitation frequency signal from the excitation frequency generating circuit 231 so as to shift the input signal. Then the phase shift circuit 232 outputs signals being phase shifted against the other by 90°, to the voltage control amplifier 234. The amplitude control circuit 233 inputs the synchronizing signal and the excitation frequency signal from the excitation frequency generating circuit 231, so as to output an amplitude modulating signal to the voltage control amplifier 234. Here the amplitude modulating signal serves to modulate an amplitude of each amplitude control signal with respect to the scanning time which is synchronized with the synchronizing signal. Under the circumstances, the voltage of the amplitude modulating signal goes through a sawtooth-like linear change or a nonlinear change with respect to a scanning time, and also a staircase-like change with respect to a resonance cycle in synchronization with the synchronizing signal. As to another modified example of this voltage change, the voltage goes through a sawtooth-like linear change or a nonlinear change in synchronization with the synchronizing signal, occurring consecutively. The voltage control amplifier 234 receives from the excitation frequency generating circuit the signals being phase shifted by 90° against one another. Then the voltage control amplifier 234 outputs to each excitation means the excitation control signal phase shifted by 90° against the other, while having a voltage of the amplitude modulating signal as an amplitude value.

Next the operation of the image display device of the present invention will be described.

Generally, an oscillation amplitude of the optical scanner which is to be resonant-driven is characterized in that it can be indicated by a sine wave which has an extremely small number of distortions. Mathematically, it is known that a locus of a circuit can be given by a combination of a sine wave and a cosine wave, and that when oscillating and combining two sine waves having the same maximum amplitude and frequency in a way that they are shifted against each other by 90°, the locus will become a circle. The same effect applies to the light beam scanning method using optical scanners, wherein the light being light beam scanned around the x-axis by the x-axis optical scanner 21 which is driven by the same resonance frequency is introduced to the y-axis optical scanner 22 having a 90° phase shifted oscillation amplitude, so as to repeat the light beam scanning in the y-axis direction. Accordingly, the x-axis optical scanner 21 and the y-axis optical scanner 22 can be sufficient enough to be compact scanners of the same kind and size.

Figure 5:
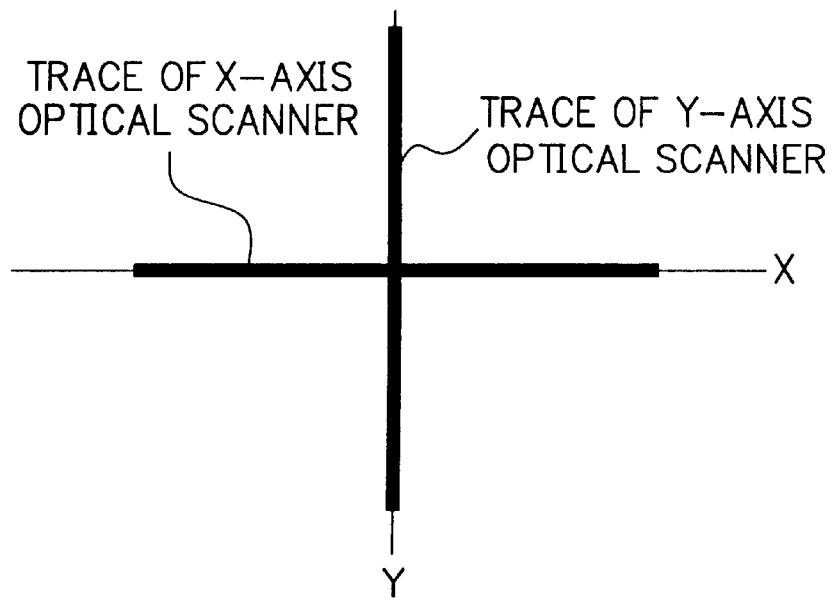
FIG. 5 is a diagram illustrating a trace of a light beam scanning of each optical scanner shown in FIG. 2, as each scanner is driven independently.
Figure 6:
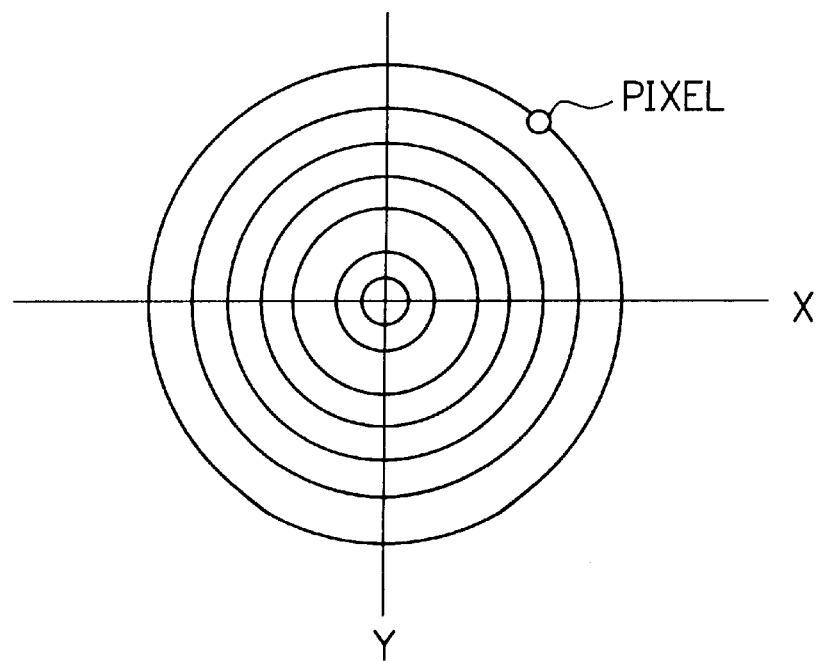
FIG. 6 is a diagram illustrating a trace of a light beam scanning of the two optical scanners shown in FIG. 2, as they are driven together.

FIG. 5 is a trace diagram illustrating a trace of a light beam scanning which is obtained when the x-axis optical scanner 21 and the y-axis optical scanner 22 are driven individually. FIG. 6 is a trace diagram showing a trace of a light beam scanning which is obtained when it is carried out by utilizing a light while both the optical scanner 21 and the optical scanner 22 are driven with the same frequency as each oscillation is phase shifted by 90° with respect to the other. Here the trace will become a circle. Unlike the electric system, the actually manufactured optical scanner is accompanied with a discrepancy arising from a design value, by which each resonance frequency has to put up with an error of some degree. However, for the resonance characteristic is broad, it is possible to obtain a circle which is in a complete state of stillness. When modulating the amplitude of the oscillation in a sawtooth-like form in synchronization with the synchronizing signal of image refreshing, the light beam is scanned on the concentric circle. Thus, there is formed a certain figure, i.e. a raster, having a scan line structure of a concentric circle pattern.

Under the circumstances, in principle, since it is only a single dot which is illuminated at a certain moment, there is no need for the base raster to be formed as a circle. Instead, when the oscillation amplitude is varied in several ways, as long as a condition such that all dots of an image to be drawn are being passed through is fulfilled, any kind of figure including the ones which are overlapping on a plane can be applied. However, in assuming the use of resonance optical scanner for the light beam scanning, applying a sine wave is most appropriate.

Moreover, the speed limit to the synchronizing signal of image refreshing depends on the time when energy being accumulated due to resonance of the applied optical scanner attenuates. Under general conditions, the largest factor of attenuation is the air hitting the surface of the mirror, while attenuation of materials constructing the mirror is considered as a smaller factor. With respect to the optical scanners 21 and 22 of the present embodiment, the attenuation factor would have a considerable size, by which they react to the extent of about 200 Hz. Consequently, it is possible to easily accomplish a 60 Hz image refreshing with a speed such that flickers are hardly caught by bear eyes.

By synchronizing with a synchronizing signal of image refreshing, and changing the amplitude of each excitation control signal in many ways with respect to a scanning time, it is possible to obtain various image display periods, blank imaging periods, or shapes of rasters.

Figure 7A:
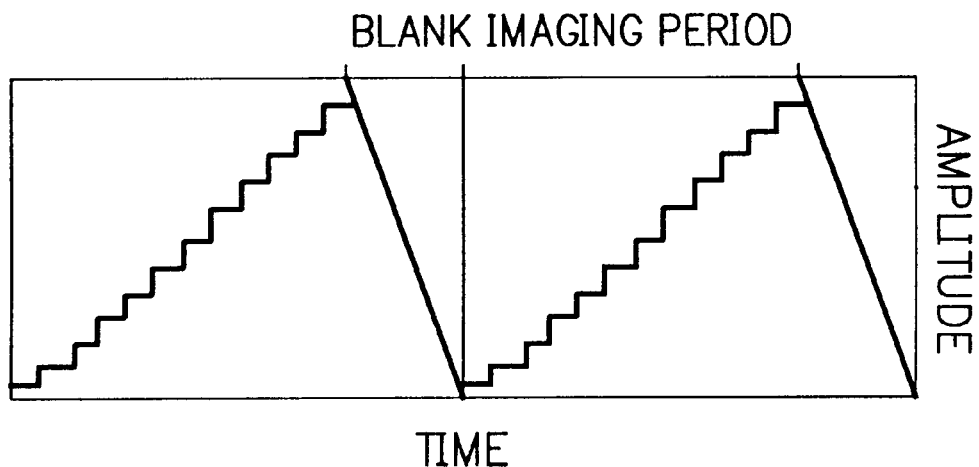
FIG. 7A is a diagram showing an example of a sawtooth-like linear change of an amplitude of an excitation control signal.
Figure 7B:
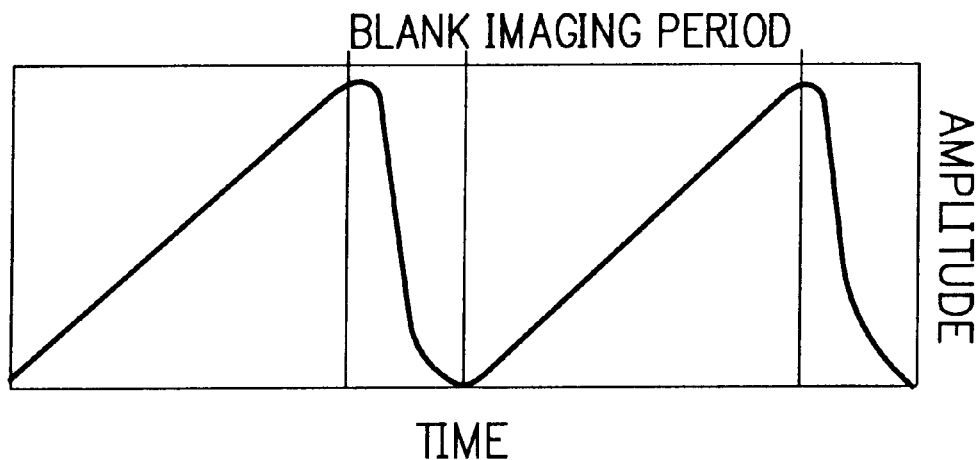
FIG. 7B is a diagram showing another example of the sawtooth-like linear change of the amplitude of the excitation control signal.
Figure 8A:
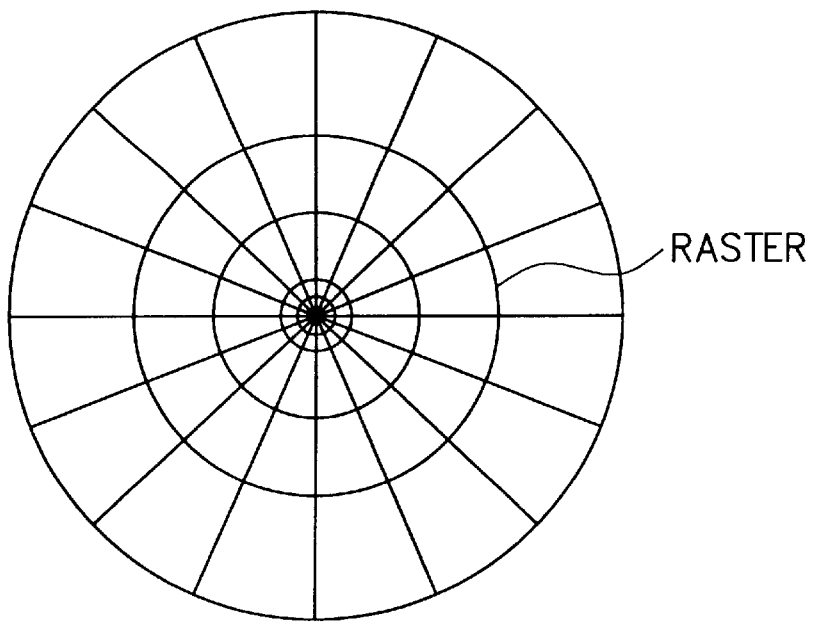
FIG. 8A is a diagram showing an example of a scanning line structure corresponding to the case shown in FIG. 7A.
Figure 8B:
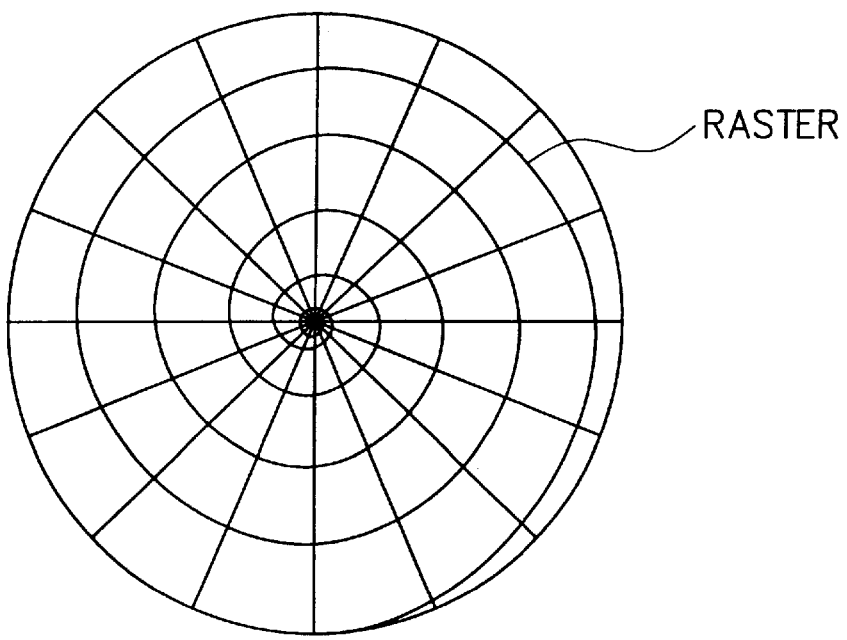
FIG. 8B is a diagram showing another example of the scanning line structure corresponding to the case shown in FIG. 7B.

FIGS. 7A and 7B are diagrams showing examples in which an amplitude of each excitation control signal is linear-changed in a sawtooth-like form with respect to a scanning time, while each excitation control signal is synchronized with a synchronizing signal of image refreshing. FIG. 7A shows an example in which the excitation control signal is changed in a staircase-like form at each resonance cycle with respect to the scanning time. On the other hand, FIG. 7B shows an example in which the excitation control signal is changed consecutively with respect to the scanning time. Here, during what is regarded as an imaging period, brightness of the light source such as a laser light etc. is modulated. A blank imaging period is a period in which the mirror amplitude is reset. During this period, the brightness of the light source is set to zero and the image cannot be displayed. The blank imaging period of this embodiment is the same as the one in the prior art imaging system. FIGS. 8A and 8B are figures showing examples of scanning line structures corresponding to the two cases described with reference to FIGS. 7A and 7B. The scanning line structure shown in FIG. 8A takes a form of a concentric circle, whereas the scanning line structure shown in FIG. 8B takes a spiral form.

Figure 9A:
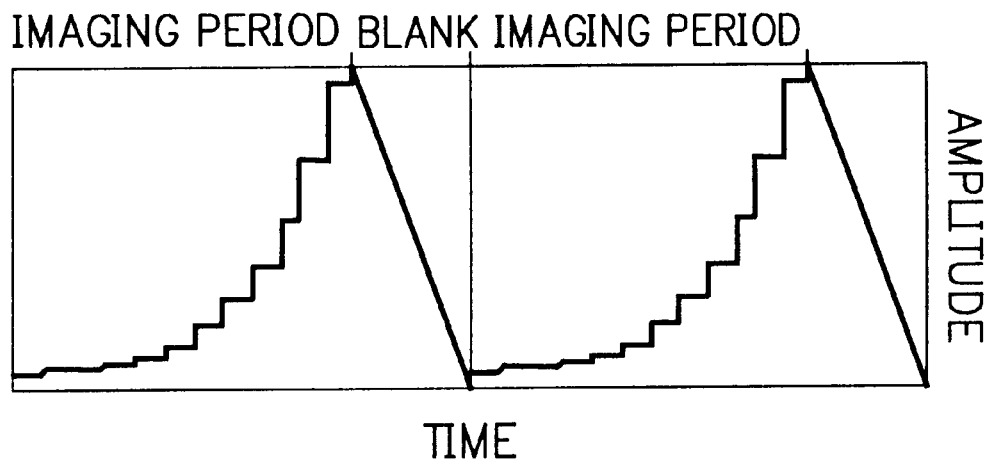
FIG. 9A is a diagram showing an example of a sawtooth-like nonlinear change of an amplitude of an excitation control signal.
Figure 9B:
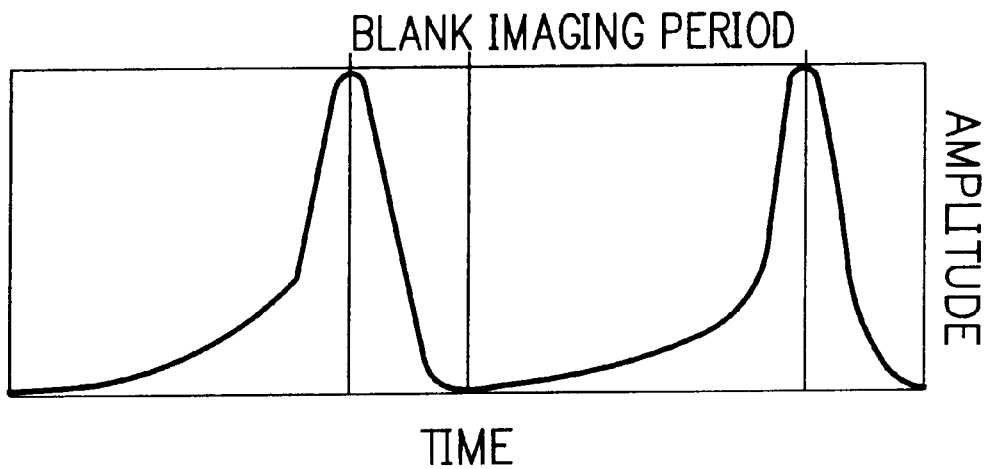
FIG. 9B is a diagram showing another example of the sawtooth-like nonlinear change of the amplitude of the excitation control signal.
Figure 10A:
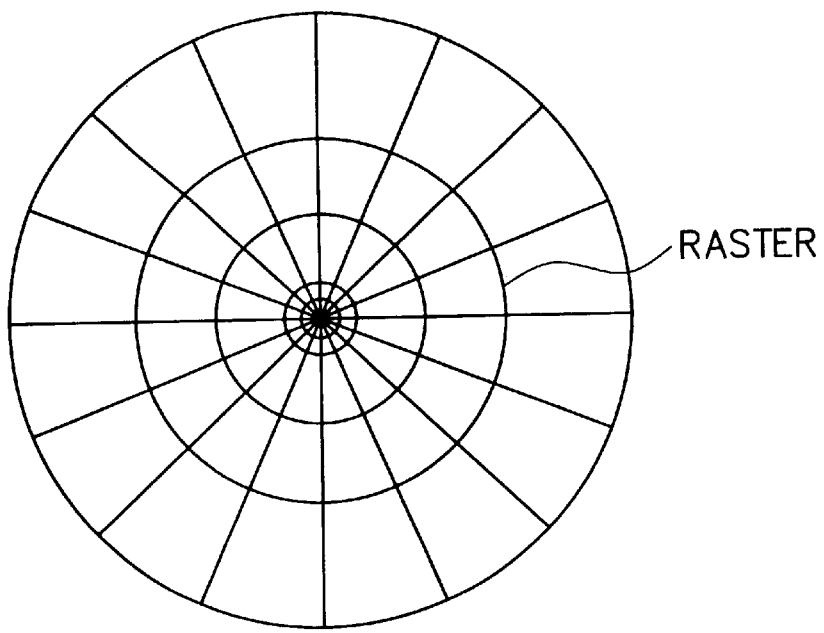
FIG. 10A is a diagram showing an example of a scanning line structure corresponding to the case shown in FIG. 9A.
Figure 10B:
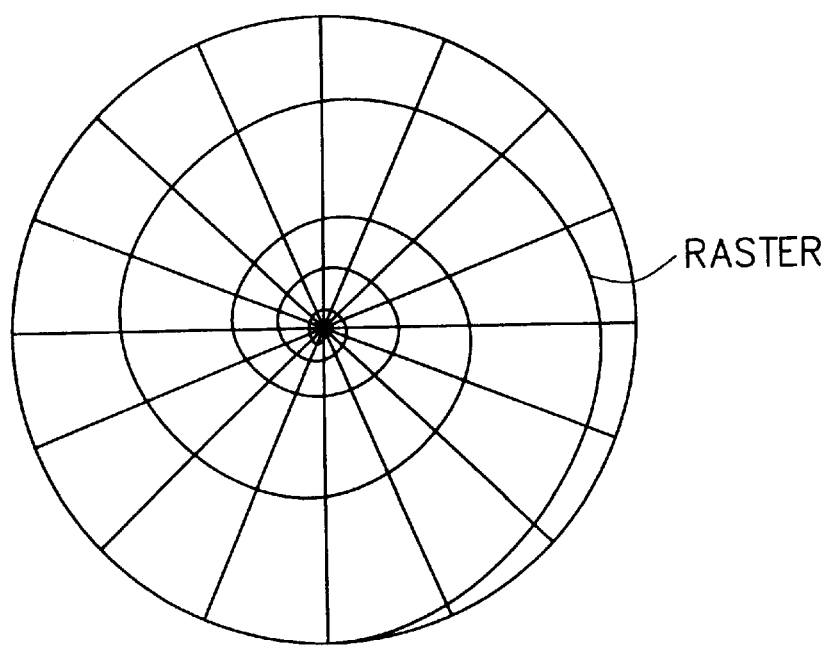
FIG. 10B is a diagram showing another example of the scanning line structure corresponding to the case shown in FIG. 9B.

FIGS. 9A and 9B are diagrams showing examples in which an amplitude of each excitation control signal is linear-changed in a sawtooth-like form with respect to a scanning time, while each excitation control signal is synchronized with a synchronizing signal of image refreshing. FIGS. 10A and 10B are figures showing examples of scanning line structures corresponding to the two cases shown in FIGS. 9A and 9B. The scanning line structure shown in FIG. 10A takes a form of a concentric circle, whereas the scanning line structure shown in FIG. 10B takes a spiral form. In both cases, the raster or pixel concentration is changed according to the distance from the center, which suggests that it is possible to easily acquire an image with a resolution distribution which is high in the center part and low in the circumference.

Figure 11:
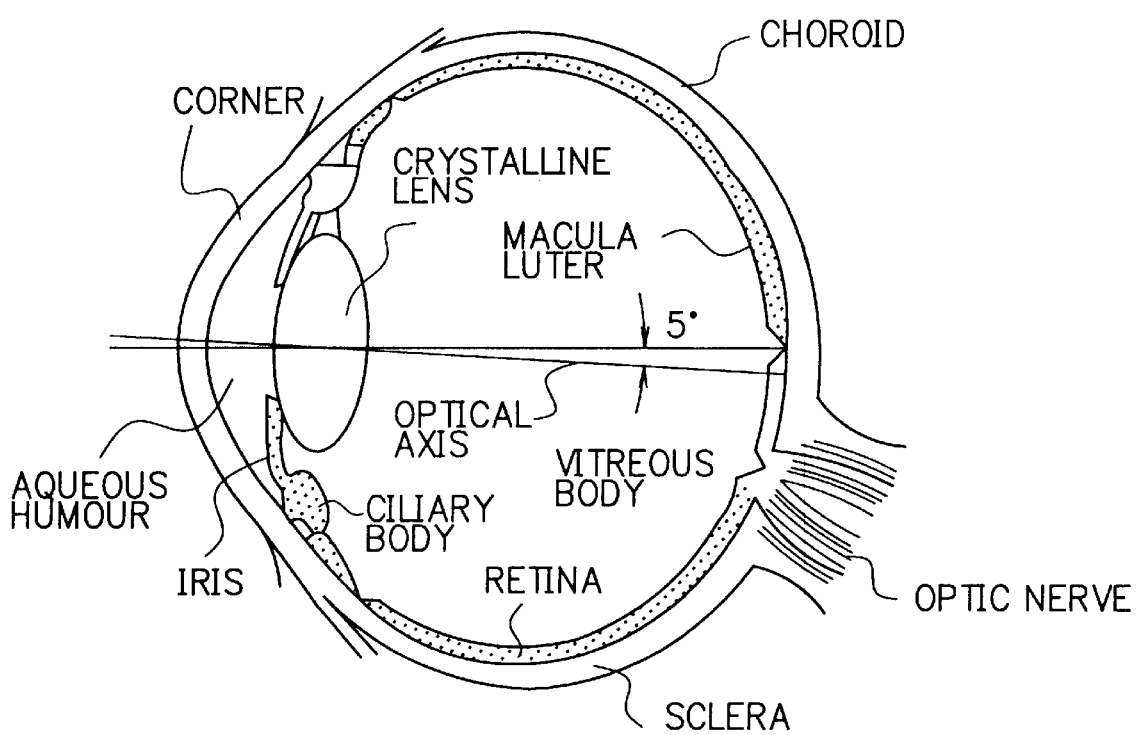
FIG. 11 is a diagram showing a structure of a human eye.

Each eye of a person who is glancing at this picture image has a crystal lens which serves in a likely manner of a lens of a camera, and a retina which corresponds to a film of the camera. The ray of light incident on the surface of the eye is properly refracted by a crystal lens so as to be connected to the retina. FIG. 11 is a structural diagram illustrating a structure of a human eye. The retina has two kinds of optic cells which react with light stimuli. One is called a cone. Cones are concentrated in about 3 mm φ of the central part where a sight center image forms an image. These cells are active in bright areas, and have a high resolution and a color perceiving capability. What surround those cones are rods which are cells active in darker areas, with a low resolution and no color sense. Human beings perceive images by adequately selecting and using those two different kinds of cells in accordance with the brightness. Each cell is arranged on a concentric circle together with the cells having the same resolution. As to one notable characteristic of the cells, their resolutions are drastically decreased from the center toward the circumference.

An angle of visibility with respect to the 3 mm φ center is about 4°. That is, it is this small portion of area which a human being is capable of focusing on an object at a time and observe the details. Although the information within the image is considerably small, the brain remembers each small fragment of information, and skillfully link them together to form a complete image, which the observer is considered to be watching. Therefore, the scanning line structures of FIGS. 10A and 10B are capable of reproducing images in which the resolutions of center pixels positioned in a sight center are high while the circumference pixels become coarser further they are positioned from the center.

Figure 12A:
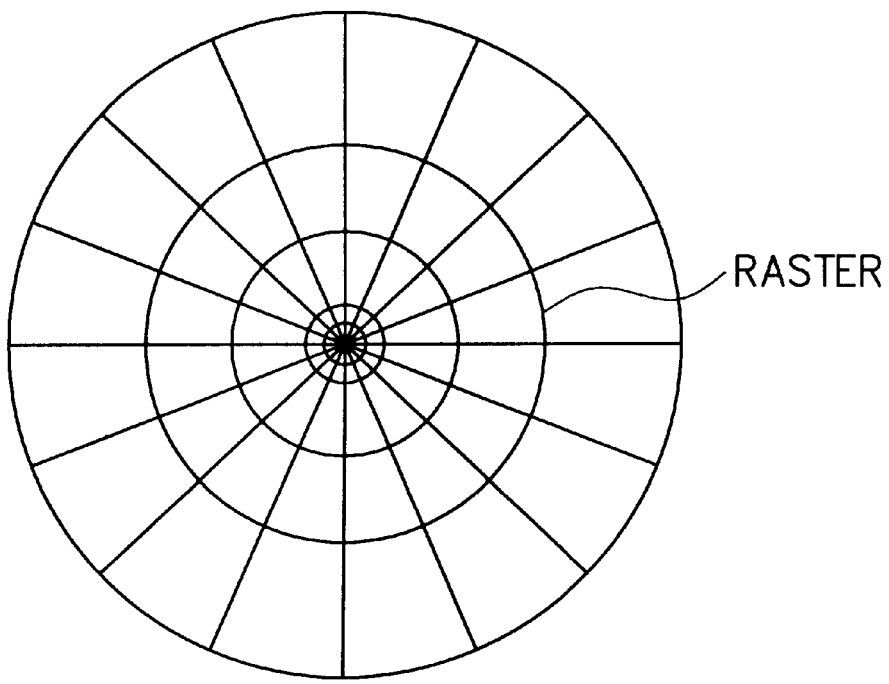
FIG. 12A is a diagram showing an example of a scanning line structure with respect to a particular amplitude ratio of the x-axis and y-axis excitation control signals.
Figure 12B:
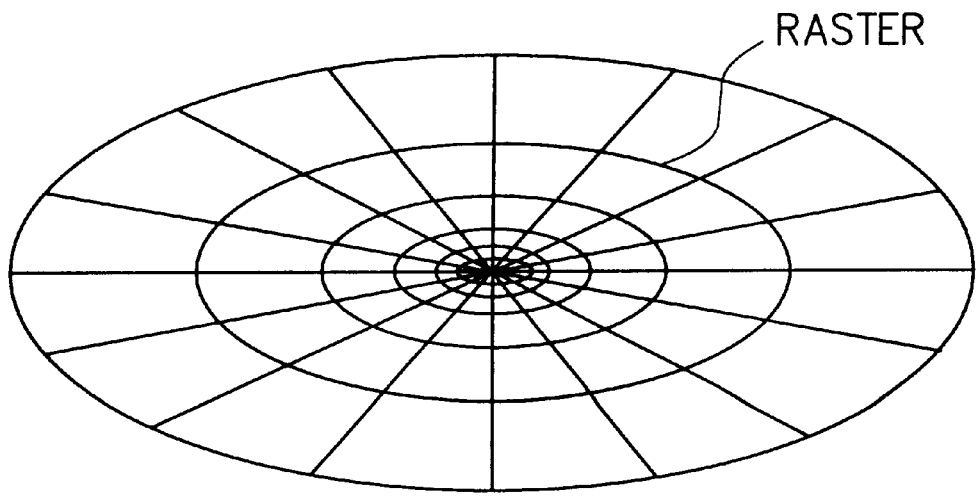
FIG. 12B is a diagram showing another example of the scanning line structure with respect to a particular amplitude ratio of the x-axis and y-axis excitation control signals.

As to a modified version of the image display device of the present embodiment, it is possible to arrange the predetermined amplitude ratio of each excitation control signal of the x-axis optical scanner 21 and the y-axis optical scanner 22 by synchronizing the amplitude with a synchronizing signal of image refreshing. FIGS. 12A and 12B illustrate examples of scanning line structures with respect to a predetermined amplitude ratio of the x-axis and y-axis excitation control signals. FIG. 12A shows a case in which the predetermined amplitude ratio is set to 1:1, while FIG. 12B shows a case in which the predetermined amplitude ratio is set to 1:2. Generally, human visibility is wider in a horizontal direction than a vertical direction. The same effect is possible by an oval scanning line structure as shown in FIG. 12B.

Figure 13A:
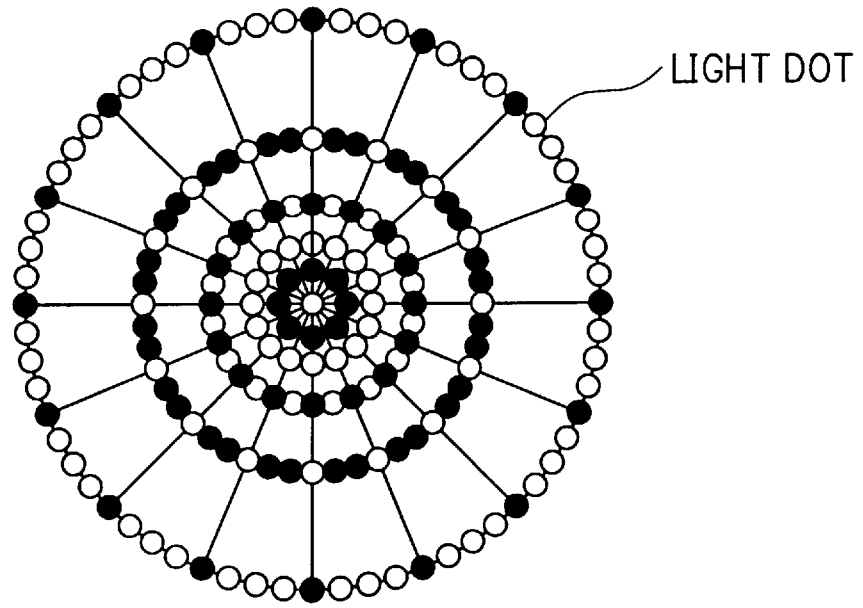
FIG. 13A is a diagram showing an example of a scanning line structure of a second embodiment of the image display device of the present invention.
Figure 13B:
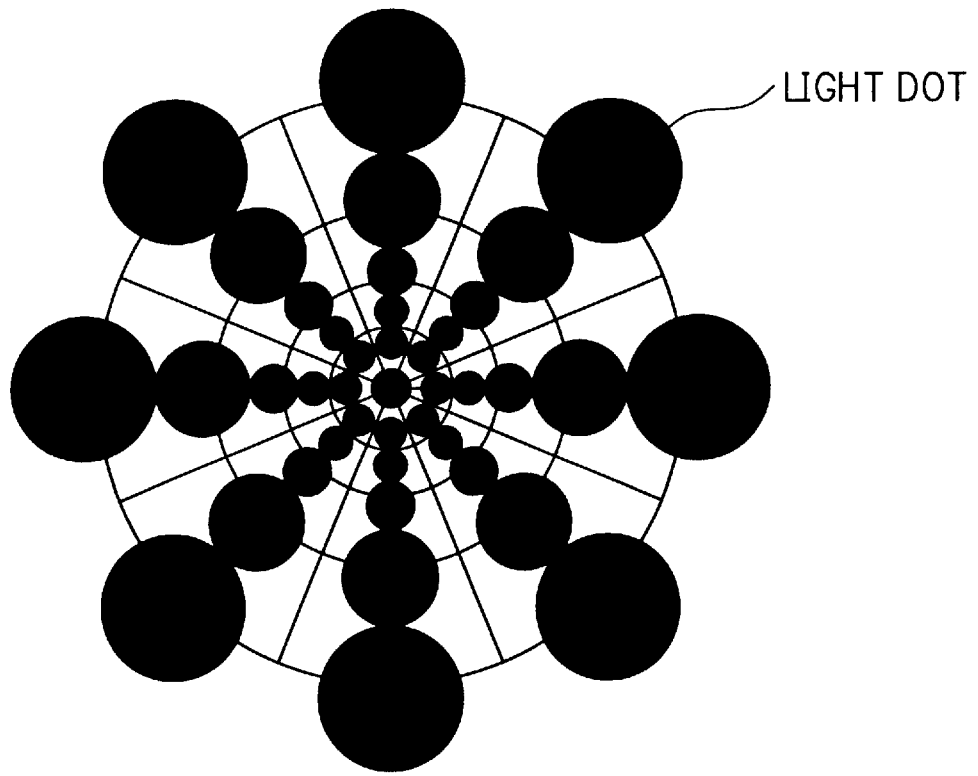
FIG. 13B is a diagram showing another example of the scanning line structure of the second embodiment of the image display device of the present invention.

Further, as pixels are given some flexibility in their shapes and sizes, it is possible to obtain a variety of base rasters. For example, as for another modified version of the image display device of the present invention, it is possible to replace the light converting means of the present embodiment with another light converting means which conducts brilliance modulation according to an amplitude of each excitation control signal, so as to output the light beam to the light beam scanning means. FIGS. 13A and 13B are diagrams showing examples of scanning line structures of a second embodiment of the present invention, which is just explained. FIG. 13A illustrates an example in which a number of pixel forming optical dots of the same size are increasing according to a distance from the center. FIG. 13B shows an example in which optical dots are becoming bigger in size according to a distance from the center.

Figure 14:
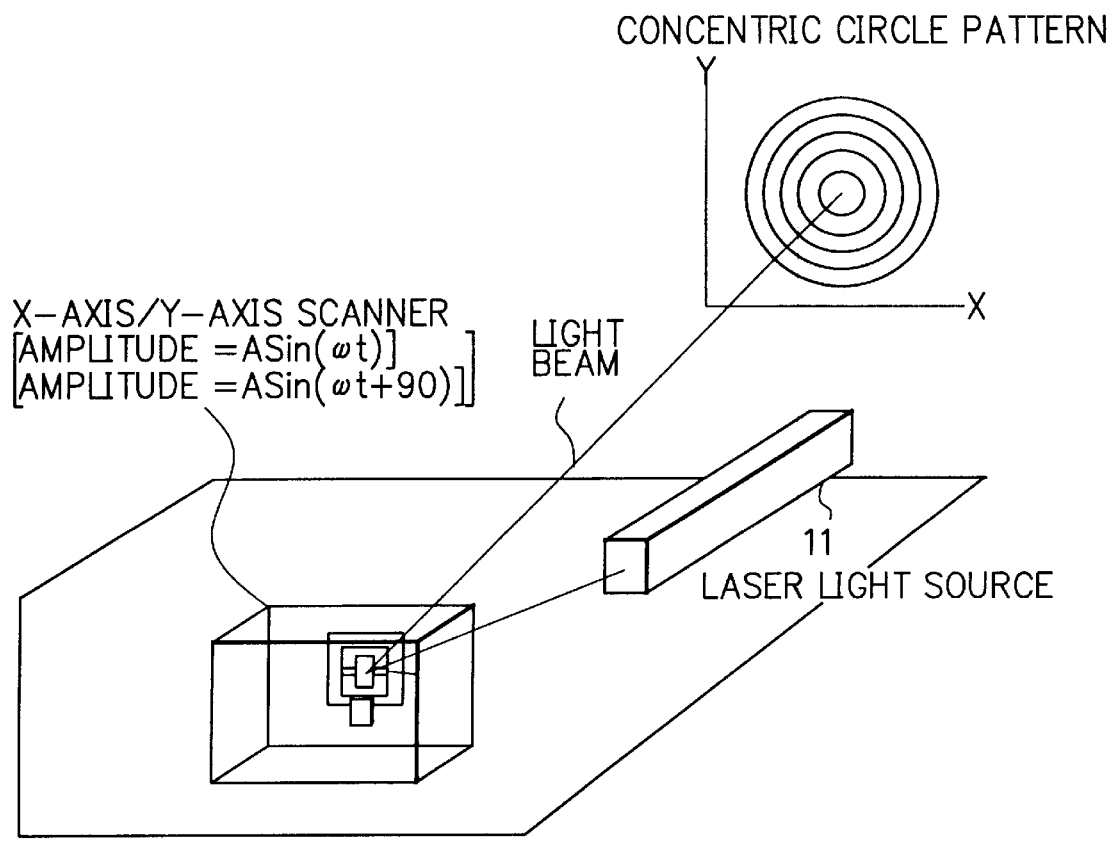
FIG. 14 is a route diagram showing a route of a light beam in a third embodiment of the image display device of the present invention.

FIG. 14 is a route diagram showing a route of a light beam in a light converting means 1 and a light beam scanning means 2 of the image display device of a third embodiment. The image display device of the the present embodiment has the same structure as that of the first embodiment except for a moving mirror at a light beam scanning means 2. As to the aspects overlapping with the first embodiment, repeated explanation will be omitted. The light scanning means 2 of the present embodiment has a single moving mirror which reflects a light beam from a light source. The reflection direction of this moving mirror is oscillated with two resonance rotation oscillation modes having rotation axis which are perpendicular to each other, due to a light beam scanning. The resonance rotation oscillations have the same or close frequency, a 90° phase shift with respect to the other, and a predetermined amplitude ratio, and are excited by excitation control signals. The oscillations of the two resonance rotation oscillation modes having a combination of a sine wave and a cosine wave of the same frequency form an image with a scanning line structure of a concentric circle form or of a spiral form, as in the case of the first embodiment.

Figure 15:
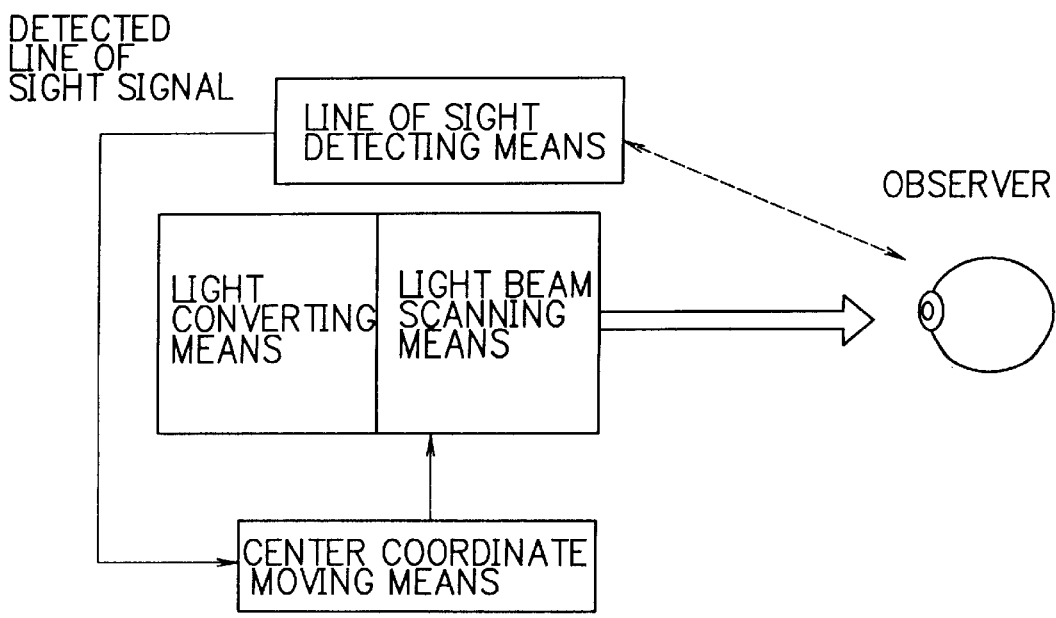
FIG. 15 is a block diagram of a fourth embodiment of the image display device of the present invention.

FIG. 15 is a block diagram showing a fourth embodiment of the image display device of the present invention. The structure of the present embodiment takes a form in which a line of sight detecting means 31 and a center coordinate moving means 32 are added to the structure of the first embodiment. In the following, a description will be given only with respect to the newly introduced constituents. As to the factors already explained, the description will be omitted.

The line of sight detecting means 31 is literally for detecting the observer's line of sight. There are variety of ways having been considered in order to make this means possible. There are ones, for example, using the characteristic of a human eye pupil which reflects infrared rays, shooting the reflected image with a camera and calculating the center of the eye by an image processing, detecting a position of the eye by measuring a microscopic voltage which is generated in the human eyeball, etc. In any case, there is acquired an analog voltage corresponding to a direction of a line of sight, of which value is amplified to a desired voltage and outputted to the center coordinate moving means 32 as a detected line of sight signal.

In response to the detected line of sight signal of the line of sight detecting means 31, the center coordinate moving means 32 is to move the center coordinate of the scanning line structure which is either of the concentric circle form or the spiral form. Then the center coordinate moving means 32 is to control so as to keep a certain distance between the observer's line of sight.

When the sight center can be grasped completely in the image display device of the present embodiment, then it is possible to reproduce an image characterized in that 4° of the center part has a high resolution while the circumference has a drastically reduced resolution, as in the case with the human eye. Thus, it is possible to obtain an image including information having no useless pieces of information, as a person is naturally looking at it.

Furthermore, in the above embodiments, there are described the cases in which the light source is of a single color. According to the present invention, however, it is obvious that applying a light source such as RGB etc. which is being color-separated so as to reproduce full colors can be easily achieved.

As described above, in accordance with the image display device of the present invention, it is possible to reproduce almost all pieces of image information to be actually used among those which a human would perceive through his/her pupils. Therefore, it is possible to reduce the amount of necessary image information as compared with the case in which an ordinary display is being applied.

In addition, since the image display device of the present invention exclusively uses a micromirror with a high resonance frequency which is over 10 kHz, it is suitable for a compact use, and is scarcely influenced by ambient noises. As the micromirror itself is solidly formed, and only one kind of mirrors should be manufactured, the device is suitable for mass production, and the quality of a reproduced image and the device's reliability are improved, by which manufacturing costs can be reduced.

Furthermore, the image display device of the present invention would not use an unchangeable low frequency resonant mirror for vertical scanning as in the conventional case, but for it is capable of altering the cycle of image refreshing which corresponds electrically to the vertical scanning, it is also capable of accurately adjusting to various image refreshing cycles and particular frequencies, which are factors noted as advantages.

While preferred embodiments of the invention have been described using specific terms, such description is for illustrative purposes only, and it is to be understood that changes and variations may be made without departing from the spirit or the scope of the following claims.

What is claimed is:

1. An image display device forming pixels by light beams which are brilliance-modulated in accordance with picture signals, implementing a light beam scanning in which a reflection direction of a light beam is oscillated in synchronization with a synchronizing signal of image refreshing, thus forming a picture image on a retina of the observer's eye or on a screen in order to complete an image display, said device comprising:

light beam scanning means including means for implementing a light beam scanning in a circumference direction of a circle having its center at a particular point on a screen or on a retina of a human eye, and for forming a picture image having a scanning line structure of a concentric circle form or a spiral form such that the pixels are altered in density or size in accordance with a distance from the center.

2. An image display device according to claim 1, wherein the implementing means includes two movable mirrors reflecting a light beam from a light source in cascade, reflection directions being subjected to a perpendicular resonant rotation oscillation with each other because of a light beam scanning, each resonant oscillation having a resonance frequency which is the same or close to the other and being phase shifted by 90° with respect to the other while having a predetermined oscillation ratio.

3. An image display device according to claim 1, wherein the implementing means includes a moving mirror reflecting a light beam from a light source, a reflection direction being oscillated with two resonant rotation oscillation modes having rotation axis which are perpendicular to each other due to a light beam scanning, each resonance rotation oscillation having a resonance frequency which is the same with or close to the other and being phase shifted by 90° with respect to the other while having a predetermined oscillation ratio.

4. An image display device according to claim 2, wherein; each resonant rotation oscillation takes air viscosity in the surroundings of each moving mirror as its oscillation attenuation factor, while having an oscillation attenuation time restricted to within one 30th of a second.

5. An image display device according to claim 3, wherein; each resonant rotation oscillation takes air viscosity in the surroundings of each moving mirror as its oscillation attenuation factor, while having an oscillation attenuation time restricted to within one 30th of a second.

6. An image display device according to claim 2, wherein the implementing means includes an excitation means for each of said mirrors, the excitation means inputting excitation control signals each of which has said resonance frequency, so as to excite each resonant rotation oscillation having an oscillation amplitude and an oscillation phase corresponding to an amplitude and a phase of each inputted excitation control signal.

7. An image display device according to claim 3, wherein the implementing means includes an excitation means for each of said mirrors, the excitation means inputting excitation control signals each of which has said resonance frequency, so as to excite each resonant rotation oscillation having an oscillation amplitude and an oscillation phase corresponding to an amplitude and a phase of each inputted excitation control signal.

8. An image display device according to claim 4, wherein the implementing means includes an excitation means for each of said mirrors, the excitation means inputting excitation control signals each of which has said resonance frequency, so as to excite each resonant rotation oscillation having an oscillation amplitude and an oscillation phase corresponding to an amplitude and a phase of each inputted excitation control signal.

9. An image display device according to claim 6, wherein;

the implementing means includes an excitation control circuit for generating a signal having said resonance frequency in synchronization with the synchronizing signal, and controlling an amplitude and a phase of the signal, so as to output it to each excitation means as the excitation control signal.

10. An image display device according to claim 9, wherein;

an amplitude of the excitation control signal is linear-changed or nonlinear-changed in a sawtooth-like form with respect to a scanning time, and changed at the same time in a staircase-like form with respect to a resonance cycle, in synchronization with the synchronizing signal.

11. An image display device according to claim 9, wherein;

an amplitude of the excitation control signal is linear-changed or nonlinear-changed in a sawtooth-like form with respect to a scanning time, and changed consecutively at the same time, in synchronization with the synchronizing signal.

12. An image display device according to claim 9, further comprising:

light converting means for implementing brilliance modulation according to the picture signal while controlling a beam width in accordance with an amplitude of each excitation control signal, thus outputting the light beam to the light beam scanning means.

13. An image display device according to claim 10, further comprising:

a light converting means for implementing brilliance modulation according to the picture signal while controlling a beam width in accordance with an amplitude of each excitation control signal, thus outputting the light beam to the light beam scanning means.

14. An image display device according to claim 11, further comprising:

light converting means for implementing brilliance modulation according to the picture signal while controlling a beam width in accordance with an amplitude of each excitation control signal, thus outputting the light beam to the light scanning means.

15. An image display device according to claim 1, further comprising:

a line of sight detecting means for detecting an observer's line of sight; and a center coordinate moving means, responsive to the line of sight detected by the line of sight detecting means, for moving a center coordinate of the scanning line structure which is either of the concentric circle form or of the spiral form.

16. An image display device, for forming pixels, comprising:

a light beam scanner including first and second movable mirrors for scanning light beams in a circumference direction of a circle having its center at a particular point on a screen or on a retina of an observer and for forming a picture image having a scanning line structure of a concentric circle form or a spiral form such that the pixels are altered in density or size in accordance with a distance from the center.

17. The image display device, as claimed in claim 16, wherein said light beam scanner further comprises:

an x-axis optical scanner for receiving said light beams and light beam scanning them around the x-axis, and outputting said light beams.

18. The image display device, as claimed in claim 17, wherein said light beam scanner further comprises:

a y-axis optical scanner for receiving said light beams, output by said x-axis optical scanner, having a 90° phase shifted oscillation amplitude and light beam scanning them around the y-axis.

19. The image display device, as claimed in claim 18, wherein said light beam scanner further comprises:

an excitation control circuit, connected to said x-axis optical scanner and said y-axis optical scanner, for outputting 90° phase shifted excitation control signals to said x-axis optical scanner and said y-axis optical scanner.

20. The image display device, as claimed in claim 19, wherein each of said x-axis optical scanner and said y-axis optical scanner is respectively provided with one of said first and second movable mirrors and an excitation device, for receiving said light beams and said 90° phase shifted excitation control signals, respectively.

21. The image display device, as claimed in claim 20, wherein said excitation device comprises a piezo voltage element attached to a corresponding one of said first and second movable mirrors.

22. The image display device, as claimed in claim 16, wherein said light beam scanner forms a picture image having a scanning line structure of a concentric circle form or a spiral form, with pixels having a density or size determined by a distance from the center.

23. The image display device, as claimed in claim 16, wherein said light beam scanner includes an excitation device for selectively moving said first and second movable mirrors.

24. An image display device, for forming pixels, comprising:

a light beam scanner including first and second movable mirrors for scanning light beams in a circumference direction of a circle having its center at a particular point on a screen or on a retina of an observer and for forming a picture image having a scanning line structure of a concentric circle form or a spiral form, said light beam scanner further including an excitation device for selectively moving said first and second movable mirrors.

* * * * *